US012808715B2

(12) United States Patent
Hung

(10) Patent No.: US 12,808,715 B2
(45) Date of Patent: Nov. 24, 2026

(54) AMBIENT LIGHT SENSORS WITH CONTROLLED ANGULAR RESPONSES

(71) Applicant: Apple Inc., Cupertino, CA (US)

(72) Inventor: Po-Chieh Hung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 18/792,161

(22) Filed: Aug. 1, 2024

(65) Prior Publication Data

US 2025/0093200 A1 Mar. 20, 2025

Related U.S. Application Data

(60) Provisional application No. 63/583,212, filed on Sep. 15, 2023.

(51) Int. Cl.

| | |
|---|---|
| ***G01J 1/42*** | (2006.01) |
| ***G01J 1/02*** | (2006.01) |
| ***H04N 23/71*** | (2023.01) |
| *H04N 23/51* | (2023.01) |

(52) U.S. Cl.
CPC ........... *G01J 1/4204* (2013.01); *G01J 1/0271* (2013.01); *H04N 23/71* (2023.01); *H04N 23/51* (2023.01)

(58) Field of Classification Search
CPC ...... G01J 1/0271; G01J 1/4204; H04N 23/51; H04N 23/71
See application file for complete search history.

(56) References Cited

U.S. PATENT DOCUMENTS

| | | | | |
|---|---|---|---|---|
| 8,619,249 | B2 | 12/2013 | Meijer et al. | |
| 11,368,609 | B2 | 6/2022 | Tokuse et al. | |
| 11,442,543 | B1 * | 9/2022 | Rai Kurlethimar | ..... G06F 3/012 |
| 11,740,723 | B2 | 8/2023 | Vampola et al. | |
| 2020/0348790 | A1 * | 11/2020 | Vampola | .............. G09G 3/3406 |

* cited by examiner

*Primary Examiner* — Kevin K Pyo
(74) *Attorney, Agent, or Firm* — Treyz Law Group, P.C.; David K. Cole

(57) ABSTRACT

An electronic device may include an ambient light sensor. An angular-response controller may overlap the ambient light sensor and may have regions with adjustable transparency to control an angular response of the ambient light sensor. In particular, the angular-response controller may include two light modulator layers, such as liquid crystal layers. Each of the light modulator layers may have transparent portions and opaque portions. To allow on-axis light to pass through to the ambient light sensor while blocking off-axis light, the transparent portions of the two layers may be aligned, and the opaque portions of the two layers may be aligned. In contrast, to allow off-axis light while blocking on-axis light, the opaque portions of the two layers may be offset. The light modulator layers may be adjusted in response to measurements from the ambient light sensor or other sensors in the device, such as motion or orientation sensors.

23 Claims, 10 Drawing Sheets

AMBIENT LIGHT SENSORS WITH CONTROLLED ANGULAR RESPONSES

This application claims the benefit of U.S. provisional patent application No. 63/583,212, filed Sep. 15, 2023, which is hereby incorporated by reference herein in its entirety.

FIELD

This relates generally to electronic devices, and, more particularly, to electronic devices with sensors.

BACKGROUND

Electronic devices such as laptop computers, cellular telephones, and other equipment are sometimes provided with sensors. For example, sensors may be incorporated into a device to provide the device with information on current environmental or device conditions.

SUMMARY

An electronic device may include an ambient light sensor. The ambient light sensor may be formed in an electronic device housing and may be overlapped by a cover layer. An angular-response controller may be included in the housing between the ambient light sensor and the cover layer. The angular-response controller may be formed in an ambient light sensor module with the ambient light sensor, or the angular-response controller may be separate from the ambient light sensor module.

The angular-response controller may have regions with adjustable transparency to control an angular response of the ambient light sensor. In particular, the angular-response controller may include two light modulator layers, such as liquid crystal layers or electrochromic layers. Each of the light modulator layers may have transparent portions and opaque portions. To allow on-axis light to pass through to the ambient light sensor while blocking off-axis light, the transparent portions of the two layers may be aligned, and the opaque portions of the two layers may be aligned. In contrast, to allow off-axis light while blocking on-axis light, the opaque portions of the two layers may be offset.

The light modulator layers may be adjusted in response to measurements from the ambient light sensor or other sensors in the device, such as motion or orientation sensors. For example, motion measurements from a motion sensor may be used to adjust the light modulator layers to allow for light distribution measurements.

In addition to, or instead of, adjusting whether the transparent and opaque portions overlap, the light modulator layers may have adjustable opaque portion densities and/or adjustable colors.

Ambient light sensors and angular-response controllers may be incorporated into any desired electronic devices, such as mobile computers, tablets, cellular telephones, wrist watch devices, or head-mounted devices, as examples.

DETAILED DESCRIPTION

An electronic device may include one or more environmental sensors, such as an ambient light sensor. In particular, the ambient light sensor may be used to measure the intensity of ambient light by generating charge in response to the ambient light that is incident on the sensor.

In some situations, it may be desirable to modify an angular response of the ambient light sensor. As illustrative examples, the angular response may be modified to avoid measuring selected ambient light, to balance the sensitivity of the sensor at different angles, or to determine a lighting distribution.

To modify the angular response of the ambient light sensor, the electronic device may include one or more patterned light modulator layers that overlap the ambient light sensor. In some illustrative embodiments, two patterned light modulator layers may be used, each having opaque regions and transparent regions. To allow more on-axis light to reach the ambient light sensor (while blocking off-axis light), the patterned light modulator layers may have overlapping or nearly overlapping opaque regions and overlapping or nearly overlapping transparent regions. On the other hand, to allow more off-axis light to reach the ambient light sensor (while blocking on-axis light), the patterned light modulator layers may have offset opaque portions (and offset transparent portions). In this way, the amount of on-axis and off-axis ambient light that reaches the ambient light sensor may be controlled.

Figure 1:
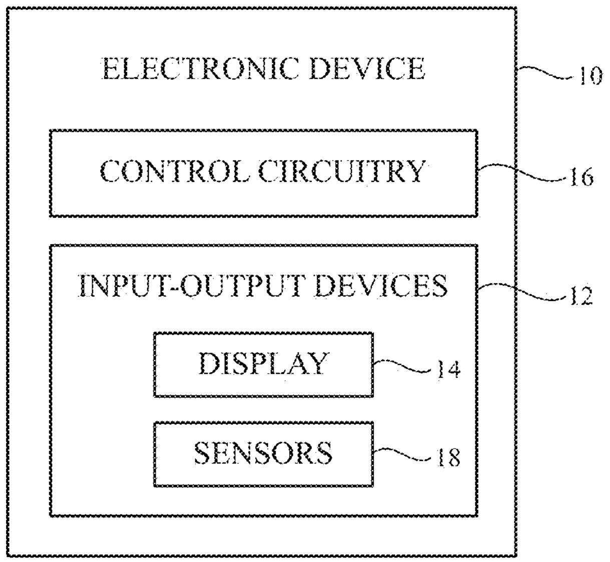
FIG. 1 is a schematic diagram of an illustrative electronic device having a display and sensor components in accordance with some embodiments.

An illustrative electronic device of the type that may be provided with one or more ambient light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a head-mounted device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may include any desired display technology, and may be an organic light-emitting diode (OLED) display, a liquid crystal display (LCD), a microLED display, or any other desired type of display.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a radio-frequency sensor, a three-dimensional image sensor, a camera, a light-based position sensor (e.g., a lidar sensor), and other sensors. Sensors 18 may also include one or more light detectors that are configured to detect ambient light (e.g., ambient light sensors). Sensors 18 may, for example, include one or more monochrome ambient light sensors and one or more color ambient light sensors that are configured to measure ambient light from the environment in which device 10 is operated. A monochrome ambient light sensor may be used to measure ambient light intensity. A color ambient light sensor may be used to measure the color (e.g., color spectrum, color temperature, color coordinates, etc.) of ambient light and may be used to measure ambient light intensity.

Figure 2:
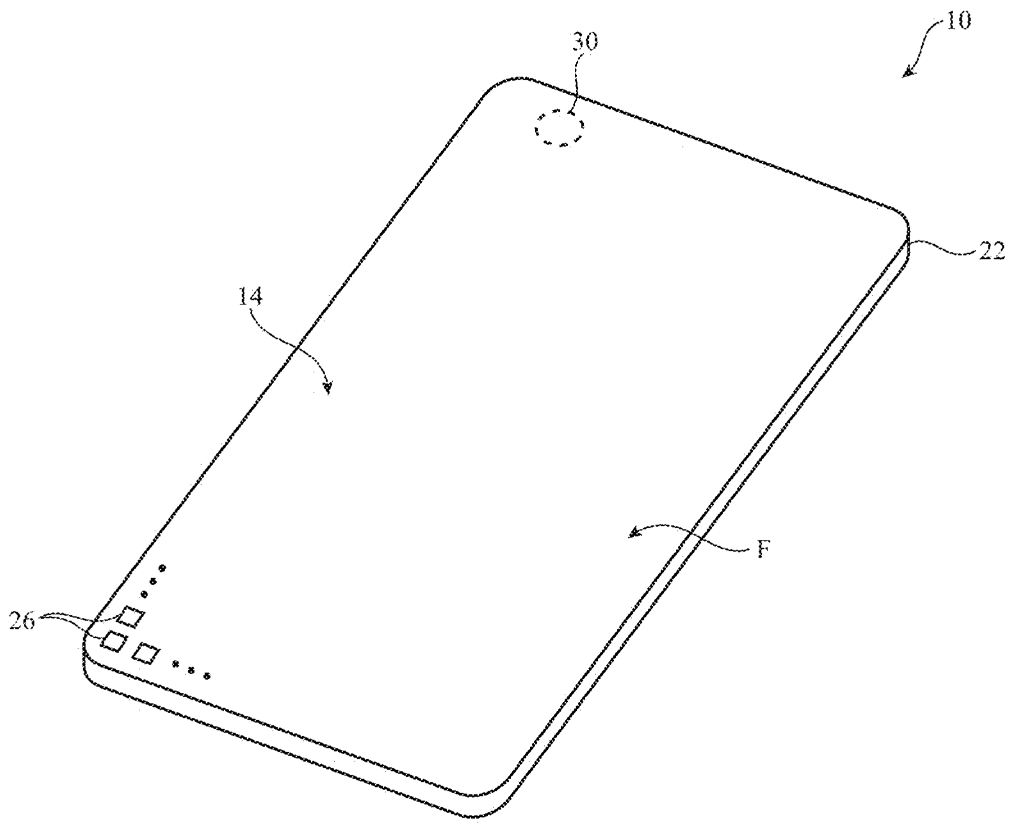
FIG. 2 is a perspective view of an illustrative electronic device with a sensor in accordance with some embodiments.

A perspective view of an illustrative electronic device of the type that may include one or more ambient light sensors is shown in FIG. 2. In the example of FIG. 2, device 10 includes a display such as display 14 mounted in housing 22. Display 14 may be a liquid crystal display, an electrophoretic display, an organic light-emitting diode display, or other display with an array of light-emitting diodes (e.g., a display that includes pixels having diodes formed from crystalline semiconductor dies), may be a plasma display, may be an electrowetting display, may be a display based on microelectromechanical systems (MEMs) pixels, or may be any other suitable display. Display 14 may have an array of pixels 26 that extends across some or all of front face F of device 10 and/or other external device surfaces. The pixel array may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of pixels 26.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 and display 14 may separate an interior region of device 10 from an exterior region surrounding device 10. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a wristband, a headband, or other strap may be coupled to a main portion of housing 22 (e.g., in configurations in which device 10 is a wristwatch or a head-mounted device).

Pixels 26 may cover substantially all of the front face of device 10 or display 14 may have inactive areas (e.g., notches, recessed areas, rectangular areas, or other regions) that are free of pixels 26. The inactive areas may be used to accommodate an opening for a speaker and windows for optical components such as one or more image sensors, analog sensors such as ambient light sensors, optical proximity sensors, three-dimensional image sensors such as structured light three-dimensional image sensors, and/or a camera flash, etc. In an illustrative configuration, pixels 26 may extend over the entirety of the front surface F of device 10 and may overlap a sensor, such as an ambient light sensor, in region 30. In this type of arrangement, ambient light may pass to the ambient light sensor in region 30 through the array of pixels 26 in display 14.

However, region 30, which may overlap an ambient light sensor in device 10, may be formed anywhere on device 10. For example, the sensor may be on a rear surface (opposite front surface F), one of the sidewalls between the rear surface and front surface F, on front surface F but not overlapped by display 14, or at any other location in device 10. Moreover, region 30 may overlap any desired type of sensor, such as an ambient light sensor, a pressure sensor, an accelerometer, or a sound sensor. In some embodiments, region 30 may be an opening in housing 22 (e.g., an opening that is filled with a cover layer that overlaps the sensor), or region 30 may be a portion of housing 22 (e.g., a transparent or semi-transparent portion of housing 22) that covers the sensor.

Regardless of where an ambient light sensor is located in device 10, the ambient light sensor may measure ambient light from a variety of incident angles. An illustrative side view of an ambient light sensor receiving light from different angles is shown in FIG. 3

Figure 3:
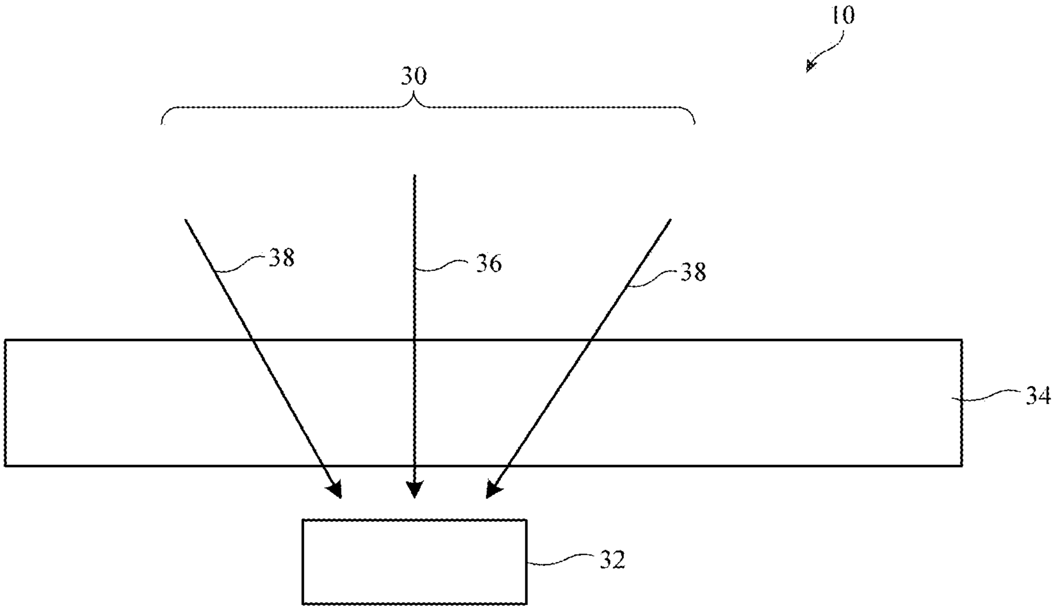
FIG. 3 is a side view of an illustrative electronic device having an ambient light sensor that detects ambient light at different angles in accordance with some embodiments.

As shown in FIG. 3, device 10 may include ambient light sensor 32, which is at least partially overlapped by cover layer 34. Cover layer 34 may be a transparent layer, such as a display cover layer that overlaps a display in device 10 (e.g., display 14 of FIGS. 1 and 2), a transparent housing layer (e.g., a rear housing wall), a window or lens that overlaps ambient light sensor 32, or another suitable layer. Cover layer 34 may be formed from glass, sapphire, ceramic, polycarbonate or other polymer, or other suitable material.

Ambient light sensor 32 may be formed in region 30 and may receive on-axis ambient light 36 and off-axis ambient light 38 through layer 34. Ambient light sensor 32 may be (or may include) a photodiode or other light-sensitive component that generates charge in response to ambient light.

In general, ambient light sensor 32 may measure ambient light 36 and 38 regardless of the angle of the ambient light. However, it may be desirable to control the angular response of ambient light sensor 32. In other words, it may be desirable to change the sensitivity of ambient light sensor 32 to on-axis and/or off-axis ambient light, so as to avoid measuring ambient light at selected angles, to balance the sensitivity of sensor 32, and/or to determine an ambient lighting distribution.

To control the angular response of ambient light sensor 32, light modulator layers may be incorporated in device 10 and may overlap ambient sensor 32. The light modulator layers may have adjustable patterns, which may be controlled to adjust the angular response of ambient light sensor 32. An illustrative side view of an electronic device that may include patterned light modulator layers is shown in FIG. 4.

Figure 4:
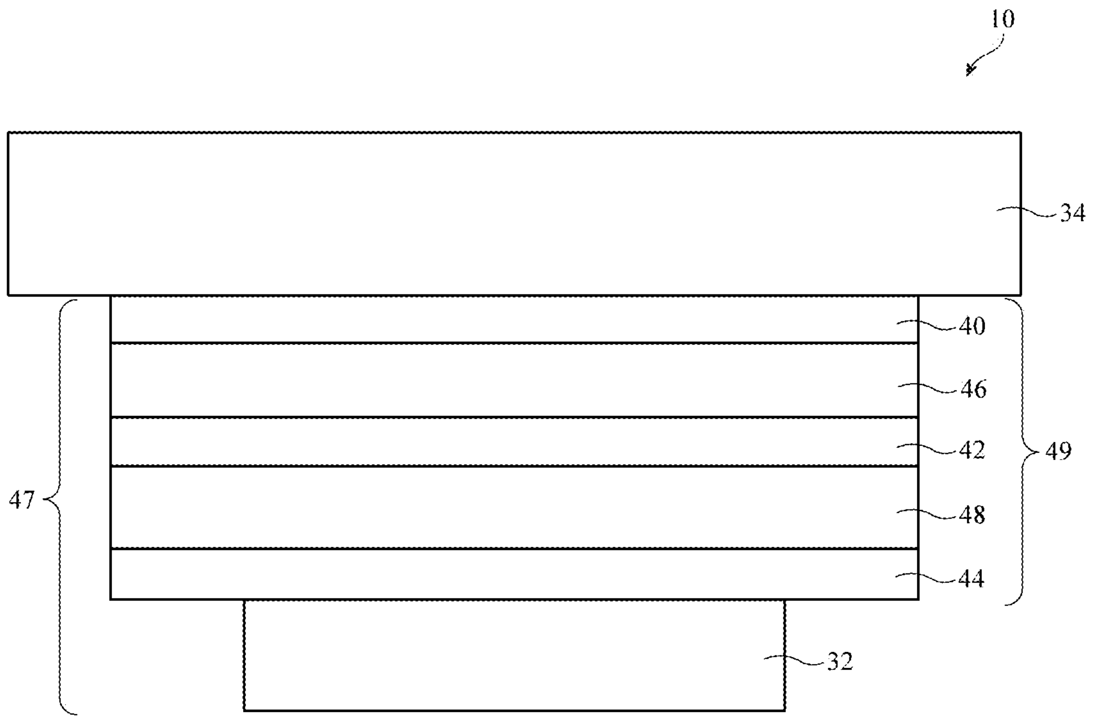
FIG. 4 is a side view of an illustrative electronic device having an angular-response controller with multiple light modulator layers overlapping an ambient light sensor in accordance with some embodiments.

As shown in FIG. 4, angular-response controller 49, which may include patterned light modulator layers 46 and 48, may be incorporated between ambient light sensor 32 and layer 34 of device 10. Patterned light modulator layers 46 and 48 may be liquid crystal layers, electrochromic layers, or other layers with adjustable transparency. Patterned light modulator layers 46 and 48 may be pixelated (e.g., have an array of individually-controllable pixels with adjustable transparency) or may have regions with adjustable transparency.

Additionally, polarizers 40, 42, and 44 may be formed between ambient light sensor 32 and layer 34 in angular-response controller 49. In other words, polarizers 40, 42, and 44 may be interspersed with patterned light modulator layers 46 and 48. Polarizers 40, 42, and 44 may be linear polarizers or circular polarizers. Polarizers 40 and 44 may be parallel to one another (e.g., may be or may include linear polarizers that are parallel), while polarizer 42 may be rotated with respect to polarizers 40 and 44. For example, polarizer 42 may be rotated by at least 25°, at least 45°, at least 60°, at least 80°, or other suitable amount relative to polarizers 40 and 42. In this way, polarizers 40, 42, and 44 may attenuate light that reaches ambient light sensor 32, while also controlling the polarization of light that reaches ambient light sensor 32.

Although not shown in FIG. 4, polarizers 40, 42, and 44 may be patterned or otherwise formed to allow for areas with different polarizations over ambient light sensor 32. Such an arrangement may allow for the detection of light with different polarizations using ambient light sensor 32.

The use of polarizers 40, 42, and 44 is merely illustrative. If desired, one or more of polarizers 40, 42, and 44 may be omitted from device 10. For example, in some embodiments, ambient light sensor 32 may receive light through layer 34 directly, without any intervening polarizers.

Moreover, although FIG. 4 shows layer 34, polarizers 40, 42, and 44, light modulator layers 46 and 48, and ambient light sensor 32 stacked without any gaps, this is merely illustrative. If desired, gaps (e.g., air gaps, fluid-filled gaps, or other gaps) and/or additional layers may be incorporated between ambient light sensor 32 and layer 34, such as between each layer.

Angular-response controller 49 may be formed separately from ambient light sensor 32 (e.g., angular-response controller 49 may be an individual component or multiple components, and may be interposed between ambient light sensor 32 and cover layer 34). Alternatively, angular-response controller 49 and ambient light sensor 32 may be formed in a single ambient light sensor module 47. In other words, angular-response controller 49 may be packaged with ambient light sensor 32 and formed behind cover layer 34.

In general, light modulators, such as light modulator layers 46 and 48, overlapping ambient light sensor 32 may be adjusted to adjust the angular response of ambient light sensor 32 by adjusting the transparency of selected portions of the light modulator layers. An illustrative example of light modulators having patterned transparent portions are shown in FIG. 5A.

Figure 5A:
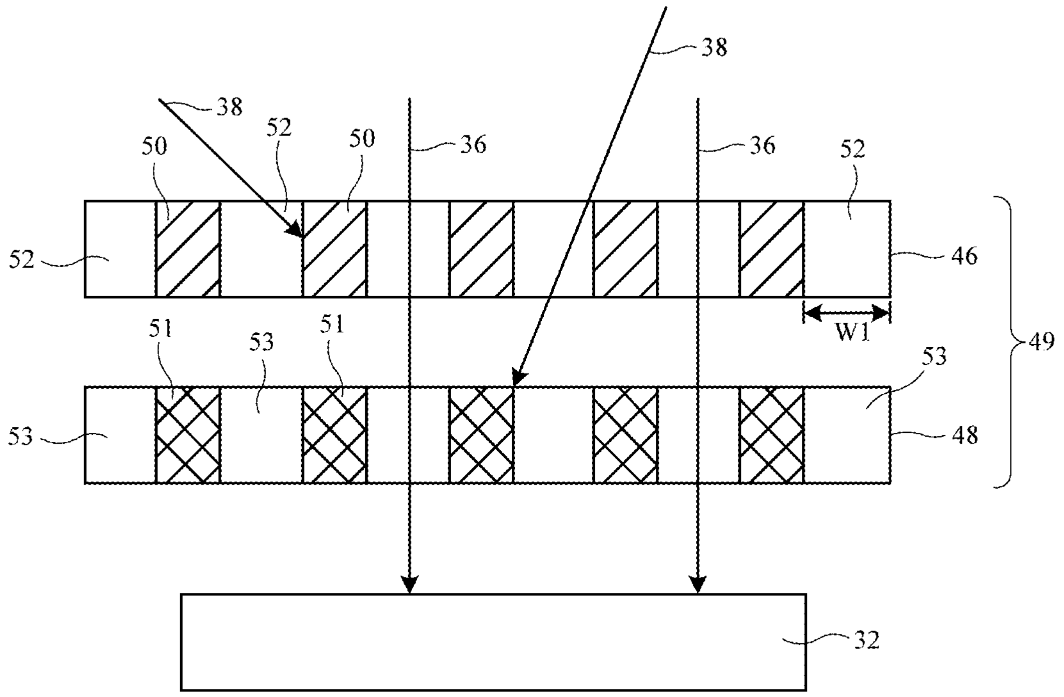
FIG. 5A is a side view of an illustrative angular-response controller with aligned transparent and opaque regions to allow on-axis light to pass in accordance with some embodiments.

As shown in FIG. 5A, light modulator layers 46 and 48 may overlap ambient light sensor 32. Although not shown in FIG. 5A, polarizers, such as polarizers 40, 42, and 44, may also overlap ambient light sensor 32, if desired.

Together, light modulator layers 46 and 48 may form angular-response controller 49 over ambient light sensor 32. In particular, light modulator layer 46 may include transparent portions 52 and portions 50 with less transparency. Portions 50 may be referred to as opaque portions herein. In other words, light modulator layer 46 may be patterned with transparent portions 52 and opaque portions 50.

In general, opaque portions 50 may have any suitable transparency that is less than the transparent portions 52. For example, transparent portions 52 may have transparencies of at least 75%, at least 80%, of 100%, of at least 90%, or other suitable transparencies, while opaque portions 50 may have transparencies of 5% or less, of 10% or less, of 25% or less, or other suitable transparencies. The transparency of transparent portions 52 and/or opaque portions 50 may vary across light modulator layer 46, if desired.

Each of portions 52 and 50 may be individually addressable portions (e.g., portions of light modulator layer 46 with adjustable transparency), or each of portions 52 and 50 may be formed from multiple pixels each having adjustable transparencies. In general, light modulator layer 46 may be patterned with portions having adjustable transparencies in any suitable manner.

Similarly, light modulator layer 48 may include transparent portions 53 and portions 51 with less transparency. Portions 51 may be referred to as opaque portions herein. In other words, light modulator layer 48 may be patterned with transparent portions 53 and opaque portions 51.

In general, opaque portions 51 may have any suitable transparency that is less than the transparent portions 53. For example, transparent portions 53 may have transparencies of at least 75%, at least 80%, of 100%, of at least 90%, or other suitable transparencies, while opaque portions 51 may have transparencies of 5% or less, of 10% or less, of 25% or less, or other suitable transparencies. Transparent portions 53 may have the same transparency as transparent portions 52, or transparent portions 53 may have a different transparency from transparent portions 52. Alternatively or additionally, the transparency of transparent portions 53 may vary across light modulator layer 48, if desired. Similarly, opaque portions 51 may have the same transparency as opaque portions 50, or opaque portions 51 may have a different transparency from opaque portions 50. Alternatively or additionally, the transparency of opaque portions 51 may vary across light modulator layer 48, if desired.

Each of portions 53 and 51 may be individually addressable portions (e.g., portions of light modulator layer 48 with adjustable transparency), or each of portions 53 and 51 may be formed from multiple pixels each having adjustable transparencies. In general, light modulator layer 48 may be patterned with portions having adjustable transparencies in any suitable manner.

In the arrangement of FIG. 5A, transparent portions 52 of light modulator layer 46 may be aligned (or nearly aligned) with transparent portions 53 of light modulator layer 48, and opaque portions 50 of light modulator layer 46 may be aligned (or nearly aligned) with opaque portions 51 of light modulator layer 48. Therefore, on-axis ambient light 36 may pass through transparent portions 52 and 53 and reach ambient light sensor 32. In contrast, off-axis ambient light 38 may be at least partially blocked (e.g., absorbed and/or reflected) by opaque portions 50 and/or opaque portions 51. In this way, angular-response controller 49 may increase the sensitivity of ambient light sensor 32 to on-axis ambient light 36, while decreasing the sensitivity of ambient light sensor 32 to off-axis ambient light 38.

In FIG. 5A, transparent portions 52 and 53 may have widths W1, such as widths of 1/12 mm or less, of between 1/12 mm and 1/16 mm, of less than 1/16 mm, of between 0.75 mm and 1.25 mm, of less than 1.5 mm, or other suitable widths. However, this is merely illustrative. If desired, transparent portions 52 and 53 may have smaller widths. For example, as shown in illustrative FIG. 5B, transparent portions 52 and 53 may have widths W2, such as widths of 1/10 mm or less, of between 1/10 mm and 1/14 mm, of less than 1/14 mm, of less than 0.5 mm, of less than 0.3 mm, of between 0.25 mm and 0.75 mm, or other suitable widths. In other words, transparent portions 52 and 53, as well as opaque portions 50 and 51, may have increased densities. By having transparent portions 52 and 53 (and opaque portions 50 and 51) with increased densities, ambient light sensor 32 may remain more sensitive to on-axis ambient light 36 than off-axis ambient light 38, while making it more difficult for a user of device 10 to see ambient light sensor 32 through transparent portions 52 and 53, as an example.

In some embodiments, light modulator layers 46 and 48 may have transparent portions 52 and 53, respectively, with adjustable widths/densities. For example, each transparent portion 52 and 53, as well as each opaque portion 50 and 51, may be formed from multiple pixels with adjustable transparencies. In other words, each pixel may be adjusted between being transparent or opaque. In particular, control circuitry, such as control circuitry 16 of device 10, may apply a voltage to each pixel of each light modulator layer and may therefore control the transparency of each pixel. By adjusting the number of pixels in each portion 50, 51, 52, and 53, the size of portions 50-53 (and therefore the densities of the opaque and transparent portions) may be adjusted. However, this is merely illustrative. In some embodiments, each transparent portion 52 and 53, as well as each opaque portion 50 and 51, may be formed from an individually adjustable region of the respective light modulator layer.

Figure 5B:
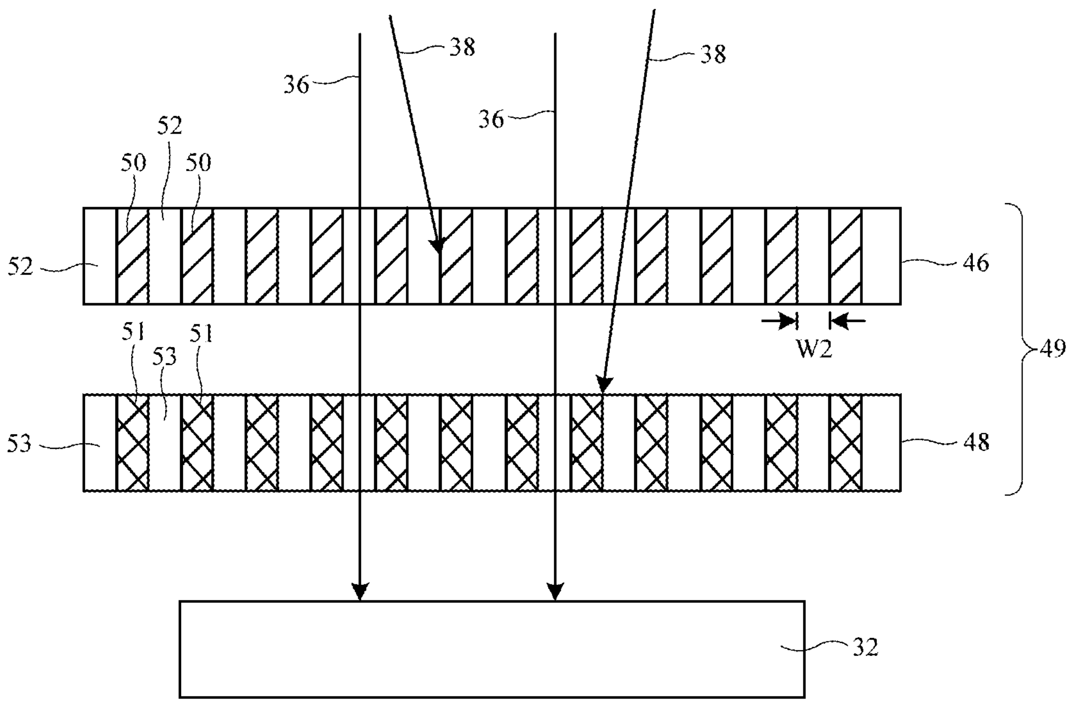
FIG. 5B is a side view of an illustrative angular-response controller with aligned transparent and opaque regions of higher densities to allow on-axis light to pass in accordance with some embodiments.

Although FIGS. 5A and 5B show transparent portions 52 having the same widths as transparent portions 53, and opaque portions 50 having the same widths as opaque portions 51, this is merely illustrative. In general, any of portions 50-53 may have different widths and/or alignments to selectively allow light of different angles to pass through angular-response controller 49.

In FIGS. 5A and 5B, angular-response controller 49 is adjusted to align (or nearly align) transparent portions 52 and 53 and to align (or nearly align) opaque portions 50 and 51, and therefore allow more on-axis ambient light 36 to pass to ambient light sensor 32 than off-axis ambient light 38 (e.g., to at least partially block off-axis ambient light 38). However, in some situations, it may be desirable to adjust angular-response controller 49 to allow more off-axis ambient light to pass to ambient light sensor 32 than on-axis ambient light. An illustrative example is shown in FIG. 6.

Figure 6:
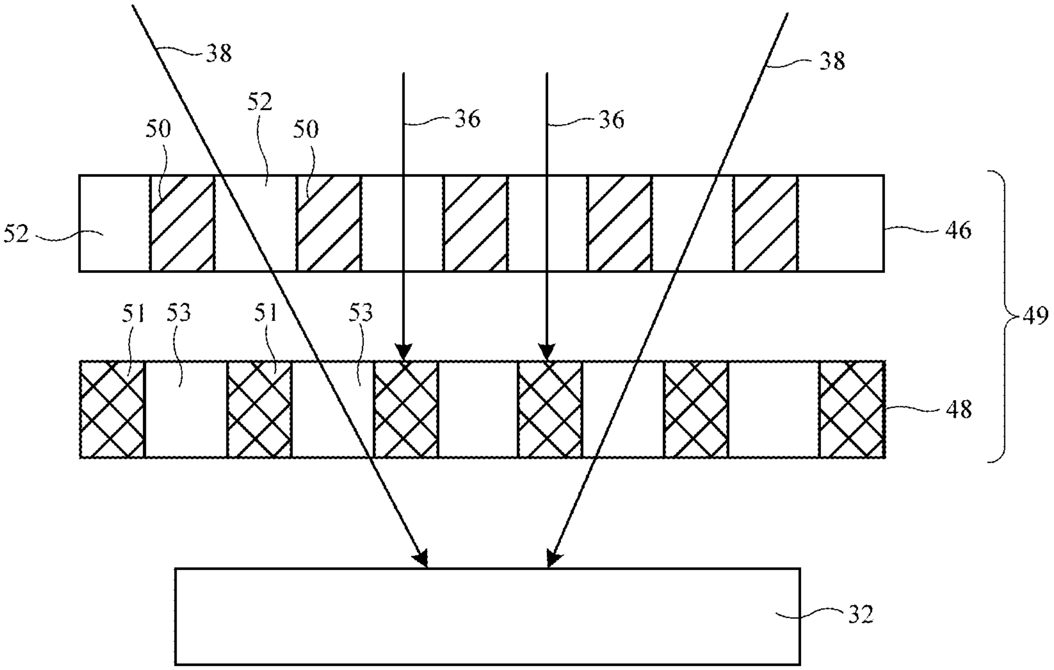
FIG. 6 is a side view of an illustrative angular-response controller with offset transparent and opaque regions to allow off-axis light to pass in accordance with some embodiments.

As shown in FIG. 6, light modulator layer 46 and/or light modulator layer 48 may be adjusted relative to FIG. 5A (or FIG. 5B). In particular, transparent portions 52 of light modulator layer 46 may be aligned (or nearly aligned) with opaque portions 51 of light modulator layer 48, and opaque portions 50 of light modulator layer 46 may be aligned (or nearly aligned) with transparent portions 53 of light modulator layer 48. In other words, transparent portions 52 may be offset from transparent portions 53, and opaque portions 50 may be offset from opaque portions 51. As a result, off-axis ambient light 38 may pass through transparent portions 52 and 53 and reach ambient light sensor 32. In contrast, on-axis ambient light 36 may be at least partially blocked (e.g., absorbed and/or reflected) by opaque portions 50 and/or opaque portions 51. In this way, angular-response controller 49 may increase the sensitivity of ambient light sensor 32 to off-axis ambient light 38, while decreasing the sensitivity of ambient light sensor 32 to on-axis ambient light 36.

To adjust the transparent and opaque regions of light modulator layer 46 and/or light modulator layer 48, control circuitry, such as control circuitry 16 of device 10, may apply a voltage to light modulator layer 46 and/or light modulator layer 48. For example, the control circuitry may apply a voltage to each pixel (or adjustable portion) of light modulator layer 46 and/or light modulator layer 48, and may therefore control the transparency of light modulator layer 46 and/or light modulator layer 48. In this way, light modulator layer 46 and/or light modulator layer 48 may be adjusted between an arrangement in which the transparent portions overlap (e.g., as in FIGS. 5A and 5B) and an arrangement in which the transparent portions are offset (e.g., as in FIG. 6), and the angular response of ambient light sensor 32 may be adjusted.

Although not shown in FIGS. 5-6, the transparent portions and opaque portions may be adjusted to overlap or be offset by any suitable amount to selectively adjust the angular response of the ambient light sensor 32. As an example, the transparent portions may be adjusted to be 50% offset to let in certain angles of ambient light between on-axis and off-axis ambient light. In general, the transparent and opaque portions may be adjusted to select for any suitable angle(s) of ambient light.

Additionally, although FIG. 6 shows transparent portions 52 having the same widths as and being completely aligned with opaque portions 51, and opaque portions 51 having the same widths as and being completely aligned with transparent portions 53, this is merely illustrative. In general, any of portions 50-53 may have different widths and/or alignments to selectively allow light of different angles to pass through angular-response controller 49. In some embodiments, for example, transparent portions 53 may have smaller widths than transparent portions 52 to further control/tune the angle of light that reaches sensor 32.

Figure 7A:
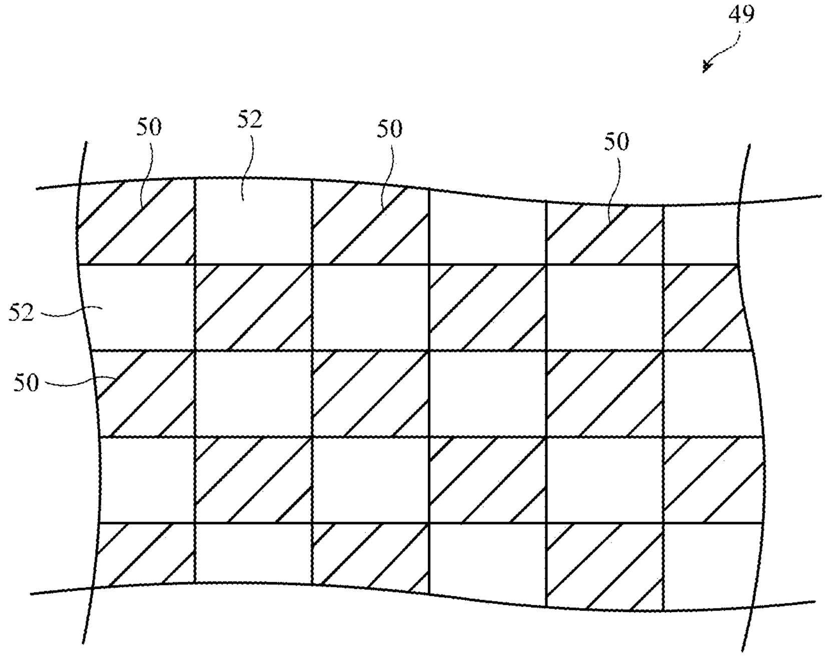
FIG. 7A is a top view of an illustrative angular-response controller with aligned transparent and opaque regions to allow on-axis light to pass in accordance with some embodiments.
Figure 7B:
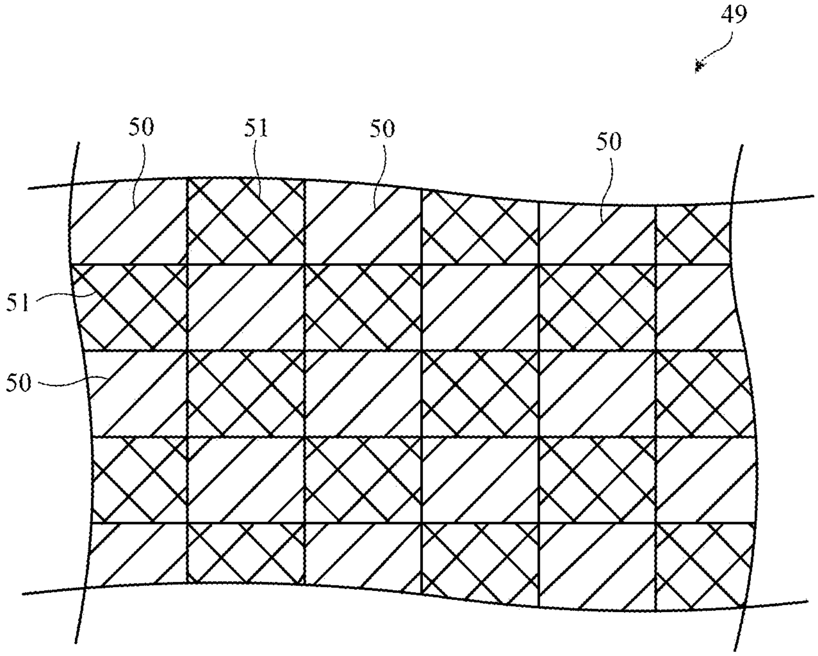
FIG. 7B is a top view of an illustrative angular-response controller with offset transparent and opaque regions to allow off-axis light to pass in accordance with some embodiments.

Top views of an illustrative angular-response controller passing on-axis ambient light and off-axis ambient light, respectively, are shown in FIGS. 7A and 7B. As shown in FIG. 7A, angular-response controller 49, when viewed from above, may have transparent regions 52 and opaque regions 50. In particular, opaque regions 50 may be aligned with opaque regions of a lower light modulator layer. As a result, on-axis light may pass through transparent regions 52, while off-axis light may be blocked by opaque regions 50 (and/or the opaque regions of the lower light modulator layer).

In contrast, as shown in FIG. 7B, angular-response controller 49, when viewed from above, may have opaque regions 50 and 51 visible. In particular, opaque regions 51 may be opaque regions of a lower light modulator layer, while opaque regions 50 may be opaque regions of an upper light modulator layer. As a result, on-axis light may be blocked by opaque regions 50 and 51, while off-axis light may pass through at an angle between the upper and lower light modulator layers (e.g., as shown in FIG. 6).

Although FIGS. 7A and 7B show angular-response controller 49 having square regions for opaque portions 50 and 51 and transparent portions 52, this is merely illustrative. In general, light modulator layers in angular-response controller 49 may have transparent and opaque regions with any suitable shapes, such as circular shapes, rectangular shapes, elliptical shapes, triangular shapes, trapezoidal shapes, or other shapes.

Moreover, although the light modulator layers in FIGS. 7A and 7B have been described as upper and lower light modulator layers, this is merely illustrative. In general, multiple light modulator layers may be oriented in any suitable direction relative to one another, and one or more of the light modulator layers may be adjusted to adjust the angular response of an ambient light measurement through the light modulator layers.

Figure 8:
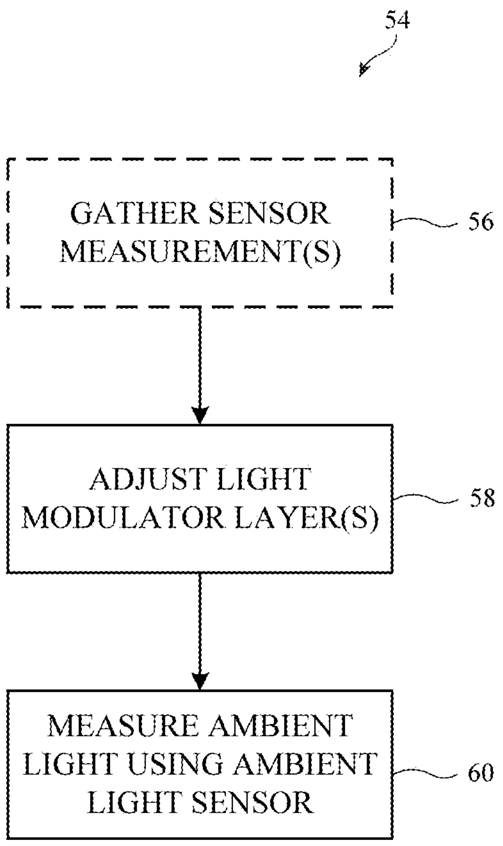
FIG. 8 is a flowchart of illustrative method steps that may be used to adjust light modulator layers over an ambient light sensor in accordance with some embodiments.

A flowchart of illustrative steps that may be used to adjust an angular-response controller for an ambient light sensor (e.g., angular-response controller 49 for ambient light sensor 32) is shown in FIG. 8.

As shown in FIG. 8, flowchart 54 may begin with optional step 56, at which one or more sensor measurements may be made. For example, a motion sensor (e.g., a gyroscope or an accelerometer) may be used to measure a movement of the electronic device (e.g., of the electronic device housing). Alternatively or additionally, an orientation sensor may measure an angle of the housing. However, these examples are merely illustrative. In general, any suitable sensor measurements may be made. Alternatively, step 56 may be omitted.

At step 58, one or more light modulator layers may be adjusted. In particular, the light modulator layers may overlap an ambient light sensor in the electronic device. In some illustrative embodiments, the light modulator layers include two patterned light modulator layers. The patterned light modulator layers may be, as examples, patterned (and/or pixelated) liquid crystal or electrochromic light modulator layers, such as light modulator layers 46 and 48 of FIGS. 4-6.

To increase the sensitivity of the underlying ambient light sensor to on-axis light and to reduce the sensitivity of the ambient light sensor to off-axis light, the light modulator layers may be adjusted to have aligned (or nearly aligned) opaque and transparent portions (e.g., as shown in FIGS. 5A and 5B). Therefore, on-axis ambient light may pass through the aligned transparent portions, while off-axis light may be blocked by the opaque portions.

In contrast, to increase the sensitivity of the underlying ambient light sensor to off-axis light and to reduce the sensitivity of the ambient light sensor to on-axis light, the light modulator layers may be adjusted to have offset opaque portions (e.g., as shown in FIG. 6). The offset opaque portions may block on-axis ambient light, while off-axis light may pass at an angle between the offset opaque portions.

Although FIGS. 5-6 show completely aligned and completely offset opaque portions having the same widths to be selective for on-axis and off-axis light, respectively, these arrangements are merely illustrative. In general, the light modulator layers may be adjusted to have opaque portions that overlap by any suitable amount and to have any suitable widths to select for a desired amount of on-axis vs. off-axis ambient light. For example, the light modulator layers may be adjusted to adjust a field-of-view of the ambient light sensor to match the field-of-view of a nearby camera in the electronic device. In this way, the ambient light measured by the ambient light sensor may match the light received by the camera, and images produced by the camera may be adjusted based on the measured ambient light.

Alternatively or additionally, one or both of the light modulator layers may be adjusted to have a different densities of transparent and opaque portions (e.g., as shown in the difference between the arrangements of FIGS. 5A and 5B). By adjusting the light modulator layer(s) to have opaque portions with different densities, the signal-to-noise ratio (SNR) of the underlying ambient light sensor may be adjusted. For example, by increasing the opaque portion density, the SNR of the ambient light sensor may be decreased, which may provide the sensor with a higher dynamic range, while decreasing the opaque portion density may increase the SNR and decrease the dynamic range. Increasing the opaque portion density may also reduce the visibility of the ambient light sensor to a user of the device.

To adjust the light modulator layers, control circuitry, such as control circuitry 16 of FIG. 1, may apply a voltage to the light modulator layers to adjust the pixels and/or patterned regions of the light modulator layers selectively. In this way, the transparency of each pixel and/or patterned region may be adjusted, and the two light modulator layers may be adjusted to allow more on-axis ambient light to pass than off-axis ambient light, and/or to adjust the SNR of the ambient light sensor.

The adjustment of the light modulator layers at step 58 may be done in response to sensor measurements, such as the sensor measurements from optional step 56. For example, the light modulator layers may be adjusted in response to motion sensor measurements. In some embodiments, if the motion sensor measurements indicate that the housing is moving a small amount (or not moving), then the patterns of the light modulator layers may be adjusted over time to allow on-axis and off-axis light to reach the ambient light sensor selectively and to determine a light distribution profile of the ambient light based on the ambient light sensor measurements and the light modulator layer adjustments. In contrast, if the motion sensor measurements indicate that the housing is moving a large amount (e.g., swinging as the user walks with the phone in their hand), then the light modulator layers may be turned off (e.g., made fully transparent) or nearly turned off to increase the SNR of the ambient light sensor. In particular, when the housing is moving a large amount, the sensor may receive both on-axis and off-axis light from different angles (e.g., the angles may change as the housing is moving), and a light distribution profile may be determined without filtering out on-axis or off-axis light based on the ambient light measurements and the movement of the housing.

Alternatively or additionally, the light modulator layers may be adjusted in response to orientation sensor measurements. In some embodiments, if the housing is held in a portrait orientation, the light modulator layers may be adjusted to allow less off-axis light than when the housing is held in a landscape orientation. In particular, because a user's eyes cover a wider field of view (FOV) of approximately 90° when the housing is in a landscape orientation than when the housing is in a portrait orientation (FOV of approximately 45°), it may be desirable to adjust the light modulator layers to capture more off-axis light that the user will also see when the housing is in the landscape mode. In other words, the light modulator layers may be adjusted between forming a first field of view for the ambient light sensor (e.g., a smaller field of view when the housing is in the portrait orientation) and forming a second field of view (e.g., a larger field of view when the housing is in the landscape orientation) for the ambient light sensor based on the orientation of the housing. However, this is merely illustrative. In general, the light modulator layers may be adjusted in any suitable manner based on measurements from an orientation sensor.

As another example, the light modulator layers may be adjusted to change color. For example, the light modulator layers may be electrochromic layers or other layers with adjustable color. In some embodiments, in response to a color ambient light sensor measurement of the color of ambient light, the color of one or both of the opaque portions of the light modulator layers may be adjusted. As a result, the opaque portions may block desired wavelengths of light selectively, which may adjust the SNR of the underlying ambient light sensor.

Another illustrative adjustment that may be made to the light modulator layers, with or without additional sensor input, is when the user holds the device near their face or head, which may be detected using measurements from one or more motion sensors, orientation sensors, and/or ambient light sensors in the device. In these situations, the light modulator layers may be adjusted to block ambient light that is reflected from the user's face or head, while allowing ambient light from other angles to pass through to the ambient light sensor. In this way, reflections from the face/head may be excluded from the ambient light sensor measurements.

These light modulator adjustments in response to sensor measurements are merely illustrative. In general, sensors in the electronic device may be used to measure any suitable environmental or internal characteristic, and the light modulator layers may be adjusted to adjust the angular response of the underlying ambient light sensor based on the measured characteristic(s).

At step 60, the ambient light sensor may be used to produce measurements in response to ambient light. For example, the ambient light sensor may be (or may include) a photodiode or other light-sensitive component that generates charge in response to ambient light. Because of the adjustments to the light modulator layers overlapping the ambient light sensor, the measurements may include more on-axis or off-axis ambient light.

Although step 58 is shown as occurring before step 60, this is merely illustrative. In some embodiments, the light modulator layers may be adjusted while the ambient light sensor is measuring ambient light. Doing so may allow for the ambient light sensor to measure ambient light from different angles during one measurement (e.g., integration of the ambient light sensor). In some illustrative embodiments, the light modulator layers may be adjusted to scan through all ambient light angles (with the exception of directly on-axis ambient light, if desired) during a single integration of the ambient light sensor. This may allow for a light distribution profile to be determined based on the ambient light measurements and the corresponding light modulator layer adjustments made during the integration time. In this way, the ambient light sensor may have spherical or near-spherical sensitivity without moving the electronic device.

In some embodiments, the light modulator layers may be adjusted between capturing wide fields of view (e.g., having high angular responses) and narrow fields of view (e.g., having low angular responses), and the total field of view (e.g., the angular response of the measurement) may be adjusted post-processing. For example, ambient light sensor 32 may make one or more measurements with a high angular response (e.g., as shown in FIG. 6) and with a low angular response (e.g., as shown in FIG. 5). After these measurements have been made, control circuitry in device 10 may calculate and/or adjust an overall angular response of the ambient light measurement based on the high angular response measurements and the low angular response measurements. In other words, the directionality of the ambient light may be determined by varying the angular response during ambient light measurements.

In an illustrative example, multiple measurements may be made with different angular responses (e.g., different directions) to estimate an ambient ultraviolet (UV) index in the environment around device 10. If large differences are measured at various narrow angular responses, the sky may be estimated as clear. If small differences are measured at various narrow angular responses, may be estimated to be cloudy. Wide angular responses may also be used to provide additional illumination information, such as the ambient brightness. Additionally or alternatively, light lower than a horizon line may be cut off, which is unnecessary to estimate UV index and may provide undesirable noise. Based on the narrow angular response measurements and/or the wide angular response measurements, a UV index in the environment around device 10 may be estimated by an ambient light sensor in device 10.

In some embodiments, adjusting the angular response of an ambient light sensor may be used to estimate a display brightness and white point. For example, the ambient light sensor may be operated with a narrow angular response (e.g., as shown in FIG. 5) to estimate a brightness and white point of a display and with a wide angular response (e.g., as shown in FIG. 6) to estimate a brightness and color of ambient light as a whole (which may include the brightness and white point of the display and the brightness and white point of other ambient light). These two measured brightnesses and white points may be compared to estimate the brightness and white point of the display. In these embodiments, the ambient light sensor may be co-located with the display (e.g., at the front and/or back of device 10) or otherwise may be oriented to detect light from the display and other ambient light.

In some embodiments, adjusting the angular response of an ambient light sensor may be used to estimate the spectral information of a camera. For example, the ambient light sensor may be co-located with (e.g., adjacent to) the camera. The angular response of the ambient light sensor may be adjusted to match the angular response of the camera. When an image is generated, the spectral information may be determined based on the ambient light sensor measurement, and color reproduction may be improved. Alternatively or additionally, the angular response of the ambient light sensor may be adjusted to be wider than the angular response of the camera. When an image is generated, the white point may be estimated based on the ambient light measurement, and the white point may be used to adjust the final image generated by the camera.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:

a housing;

an ambient light sensor in the housing;

a cover layer that at least partially overlaps the ambient light sensor;

an angular-response controller interposed between the cover layer and the ambient light sensor, wherein the angular-response controller comprises first and second light modulator layers with patterned regions of adjustable transparency; and a motion sensor in the housing configured to measure motion of the housing, wherein when the motion is below a threshold, the first and second light modulator layers are configured to be adjusted between a first mode and a second mode, and wherein when the motion exceeds the threshold, the first and second light modulator layers are configured to be fully transparent.

2. The electronic device of claim 1, wherein when the motion is below the threshold, the first and second light modulator layers are configured to be switched between the first mode in which on-axis ambient light reaches the ambient light sensor and off-axis ambient light is at least partially blocked, and the second mode in which the on-axis ambient light is at least partially blocked and the off-axis ambient light reaches the ambient light sensor.

3. The electronic device of claim 2, wherein the first and second light modulator layers comprise opaque portions and transparent portions, the opaque portions of the first and second light modulator layers are configured to be aligned in the first mode, and the transparent portions of the first and second light modulator layers are configured to be aligned in the first mode.

4. The electronic device of claim 3, wherein the opaque portions of the first and second light modulator layers are configured to be offset in the second mode, and the transparent portions of the first and second light modulator layers are configured to be offset in the second mode.

5. The electronic device of claim 1, further comprising:

control circuitry in the housing, wherein the control circuitry is configured to determine a light distribution profile based on measurements from the ambient light sensor and the adjustments to the first and second light modulator layers.

6. The electronic device of claim 1, further comprising:

control circuitry in the housing, wherein the control circuitry is configured to determine an ambient ultraviolet index based on measurements from the ambient light sensor and the adjustments to the first and second light modulator layers.

7. The electronic device of claim 1, further comprising:

a display in the housing; and control circuitry in the housing, wherein the control circuitry is configured to determine a brightness of the display based on measurements from the ambient light sensor and the adjustments to the first and second light modulator layers.

8. The electronic device of claim 1, further comprising:

a display in the housing; and control circuitry in the housing, wherein the control circuitry is configured to determine a white point of the display based on measurements from the ambient light sensor and the adjustments to the first and second light modulator layers.

9. The electronic device of claim 1, further comprising:

a camera in the housing, wherein the camera is configured to produce an image of a scene; and control circuitry in the housing, wherein the control circuitry is configured to determine spectral information of the scene while the camera produces the image based on measurements from the ambient light sensor and the adjustments to the first and second light modulator layers.

10. The electronic device of claim 1, further comprising:

control circuitry in the housing, wherein the control circuitry is configured to determine a light distribution profile based on measurements from the ambient light sensor when the motion is below the threshold.

11. The electronic device of claim 4, further comprising:

an orientation sensor in the housing configured to measure an orientation of the housing, wherein the first and second light modulator layers are configured to be adjusted between the first mode and the second mode based on the orientation of the housing.

12. The electronic device of claim 11, wherein the first and second light modulator layers are configured to form a first field of view of the ambient light sensor in response to the housing being in a portrait orientation and to form a second field of view of the ambient light sensor that is greater than the first field of view in response to the housing being in a landscape orientation.

13. The electronic device of claim 4, wherein the first and second light modulator layers are configured to switch between the first and second modes while the ambient light sensor is being integrated.

14. The electronic device of claim 4, wherein the angular-response controller is further configured to change color in response to a measurement from the ambient light sensor.

15. The electronic device of claim 4, wherein the first and second light modulator layers are configured to change densities of the opaque and transparent portions in response to a measurement from the ambient light sensor.

16. The electronic device of claim 4, wherein the first and second light modulator layers comprise first and second liquid crystal layers, and wherein the patterned regions of adjustable transparency comprise pixels of the first and second liquid crystal layers.

17. The electronic device of claim 16, wherein each of the transparent and opaque portions of the first and second liquid crystal layers comprises multiple pixels of the first and second liquid crystal layers.

18. The electronic device of claim 16, further comprising:

polarizer layers interspersed with the first and second light modulator layers.

19. An ambient light sensor module comprising:

an ambient light sensor;

a first light modulator layer that overlaps the ambient light sensor, wherein the first light modulator layer comprises first transparent portions and first opaque portions; and a second light modulator layer interposed between the first light modulator layer and the ambient light sensor, wherein the second light modulator layer comprises second transparent portions and second opaque portions, wherein the first and second light modulator layers are configured to be switched between a first mode in which on-axis light reaches the ambient light sensor and off-axis light is blocked, and a second mode in which the off-axis light reaches the ambient light sensor and the on-axis light is blocked, and wherein a light distribution profile is generated by switching between the first mode and the second mode during an integration time of the ambient light sensor.

20. The ambient light sensor module of claim 19, wherein the first transparent portions are aligned with the second transparent portions in the first mode, the first opaque portions are aligned with the second opaque portions in the first mode, the first transparent portions are offset from the second transparent portions in the second mode, and the first opaque portions are offset from the second opaque portions in the second mode.

21. An electronic device, comprising:

an ambient light sensor;

a first light modulator layer that overlaps the ambient light sensor, wherein the first light modulator layer comprises first transparent portions and first opaque portions; and a second light modulator layer interposed between the first light modulator layer and the ambient light sensor, wherein the second light modulator layer comprises second transparent portions and second opaque portions, and wherein the first and second light modulator layers are configured to be switched between a first mode in which on-axis light reaches the ambient light sensor and off-axis light is blocked to form a first field of view, and a second mode in which the off-axis light reaches the ambient light sensor and the on-axis light is blocked to form a second field of view wider than the first field of view; and an orientation sensor configured to measure an orientation of the electronic device, wherein the first and second light modulator layers are switched to the first mode in response to the electronic device being oriented in a portrait orientation and switched to the second mode in response to the electronic device being oriented in a landscape orientation.

22. The electronic device of claim 21, further comprising:

a motion sensor, wherein the first and second light modulator layers are configured to be switched between the first mode and the second mode in response to measurements from the motion sensor.

23. The ambient light sensor module of claim 19, wherein the ambient light sensor is configured to have a spherical sensitivity by switching the first and second light modulator layers between the first mode and the second mode during the integration time of the ambient light sensor.

* * * * *